United States Patent
de Lore et al.

(10) Patent No.: US 9,475,647 B2
(45) Date of Patent: Oct. 25, 2016

(54) WINCH DRUM TENSION ISOLATION SYSTEM

(71) Applicant: Joy MM Delaware, Inc., Wilmington, DE (US)

(72) Inventors: Andrew P. de Lore, New South Wales (AU); Travers T. Wood, New South Wales (AU)

(73) Assignee: Joy MM Delaware, Inc., Wilmington, DE (US)

( * ) Notice: Subject to any disclaimer, the term of this patent is extended or adjusted under 35 U.S.C. 154(b) by 21 days.

(21) Appl. No.: 14/157,672

(22) Filed: Jan. 17, 2014

(65) Prior Publication Data

US 2014/0262693 A1    Sep. 18, 2014

Related U.S. Application Data

(60) Provisional application No. 61/778,824, filed on Mar. 13, 2013.

(51) Int. Cl.
| | |
|---|---|
| *B66D 1/00* | (2006.01) |
| *B65G 23/24* | (2006.01) |
| *B65G 23/44* | (2006.01) |
| *E21C 29/16* | (2006.01) |
| *B66D 1/30* | (2006.01) |
| *B66D 5/34* | (2006.01) |

(52) U.S. Cl.
CPC ............... *B65G 23/44* (2013.01); *B66D 1/30* (2013.01); *B66D 5/34* (2013.01); *E21C 29/16* (2013.01)

(58) Field of Classification Search
CPC .................................. B66D 1/00; B65G 23/24
USPC ........................................ 198/813; 254/265
See application file for complete search history.

(56) References Cited

U.S. PATENT DOCUMENTS

| | | | |
|---|---|---|---|
| 3,033,531 A | 5/1962 | Patterson, III | |
| 3,310,158 A | 3/1967 | Reilly | |
| 3,628,505 A * | 12/1971 | Myers | 192/61 |
| 4,004,780 A | 1/1977 | Kuzarov | |
| 4,042,129 A * | 8/1977 | Hampton | 414/313 |
| 4,106,754 A | 8/1978 | Kucher | |
| 4,168,668 A | 9/1979 | Grube et al. | |
| 4,195,819 A | 4/1980 | Chastanier | |
| 4,280,605 A | 7/1981 | Papadopoulos | |
| 4,284,192 A * | 8/1981 | Taylor | 198/813 |
| 4,378,875 A * | 4/1983 | Allan et al. | 198/815 |
| 4,390,161 A | 6/1983 | Nelson | |
| 4,398,698 A | 8/1983 | Crawford et al. | |

(Continued)

OTHER PUBLICATIONS

International Search Report and Written Opinion from PCT/US2014/011977 dated May 19, 2014 (14 pages).

*Primary Examiner* — Douglas Hess
(74) *Attorney, Agent, or Firm* — Michael Best & Friedrich LLP

(57) ABSTRACT

A winch drum tension isolation system includes a winch drum including an outwardly extending flange, the flange including a plurality of holes spaced along the flange. The winch drum tension isolation system also includes a locking mechanism positioned proximate the winch drum and including a locking member engageable with the flange. The locking member is movable between a first position, in which the locking member is received in one of the plurality of holes to prevent rotation of the winch drum, and a second position, in which the locking member is spaced apart from the flange to permit rotation of the winch drum.

23 Claims, 6 Drawing Sheets

(56) References Cited

U.S. PATENT DOCUMENTS

| | | | |
|---|---|---|---|
| 4,426,064 A | 1/1984 | Healy | |
| 4,529,146 A | 7/1985 | Nederman | |
| 4,566,674 A | 1/1986 | Ebey et al. | |
| 4,953,684 A * | 9/1990 | Beswick et al. | 198/311 |
| 5,398,911 A * | 3/1995 | Holster | 254/267 |
| 5,606,849 A | 3/1997 | Bettenhausen | |
| 5,660,084 A | 8/1997 | Bettenhausen | |
| 5,690,240 A * | 11/1997 | Thiermann, Sr. | B66C 23/62 212/180 |
| 5,788,058 A * | 8/1998 | Girardey | 198/813 |
| 6,041,676 A | 3/2000 | Bettenhausen | |
| 6,203,259 B1 | 3/2001 | Christensen | |
| 6,431,103 B1 | 8/2002 | Meyerdierks | |
| 6,494,435 B1 | 12/2002 | Cauchon | |
| 6,505,573 B1 | 1/2003 | Sheikholeslam et al. | |
| 6,520,723 B2 | 2/2003 | Christensen | |
| 6,558,092 B1 | 5/2003 | Woodruff | |
| 6,595,594 B2 | 7/2003 | Royer | |
| 6,604,731 B2 | 8/2003 | Hodge | |
| 6,652,205 B2 | 11/2003 | Christensen | |
| 6,698,723 B1 | 3/2004 | Antonini | |
| 6,805,395 B2 | 10/2004 | Royer | |
| 6,929,113 B1 * | 8/2005 | Hoover et al. | 198/812 |
| 6,932,325 B1 * | 8/2005 | Selcer et al. | 254/275 |
| 6,960,053 B2 | 11/2005 | Woodruff | |
| 6,997,326 B2 * | 2/2006 | Weir | 209/617 |
| 7,108,246 B2 | 9/2006 | Fortin | |
| 7,318,579 B1 * | 1/2008 | Novoa | E06C 7/12 254/278 |
| 7,325,773 B2 | 2/2008 | Gorrie | |
| 7,513,485 B2 * | 4/2009 | Lee | 254/346 |
| 7,866,462 B2 * | 1/2011 | DeMong | 198/810.04 |
| 7,896,316 B2 | 3/2011 | Willim | |
| 7,967,278 B2 | 6/2011 | Anderson et al. | |
| 8,308,410 B2 | 11/2012 | Foryan | |
| 8,616,529 B2 * | 12/2013 | Kim et al. | 254/385 |
| 2002/0021018 A1 | 2/2002 | Royer | |
| 2004/0013490 A1 | 1/2004 | Cauchon | |
| 2007/0048103 A1 | 3/2007 | Williams et al. | |
| 2008/0314690 A1 | 12/2008 | Campbell et al. | |
| 2011/0253958 A1 | 10/2011 | Anderson et al. | |

* cited by examiner

WINCH DRUM TENSION ISOLATION SYSTEM

CROSS-REFERENCE TO RELATED APPLICATIONS

This application claims priority to U.S. Provisional Application No. 61/778,824, filed Mar. 13, 2013, the entire contents of which are incorporated herein by reference.

FIELD OF THE INVENTION

The present invention relates to a conveyor system for an underground mining machine, and in particular an isolation system.

BACKGROUND OF THE INVENTION

Large, heavy winches are used in the underground mining industry. These heavy winches are used to keep tension on the conveyors (e.g., belts), which carry material out of the underground mine. The winches include a winch drum (i.e., a rotating piece upon which a winch rope is wound), an electric motor and gearbox for turning the winch drum, and a park brake. Occasionally a conveyor experiences an emergency stop and the park brake sees dynamic braking loads causing it to overheat and seize. The seized park brake ends up trapping stored energy in the conveyor, and the load cannot be released from the seized brake. This situation places operators at risk when attempting to repair or replace the motor and gearbox or park brake.

SUMMARY

In accordance with one construction, a winch drum tension isolation system includes a winch drum including an outwardly extending flange, the flange including a plurality of holes spaced along the flange. The winch drum tension isolation system also includes a locking mechanism positioned proximate the winch drum and including a locking member engageable with the flange. The locking member is movable between a first position, in which the locking member is received in one of the plurality of holes to prevent rotation of the winch drum, and a second position, in which the locking member is spaced apart from the flange to permit rotation of the winch drum.

In accordance with another construction, a conveyor system includes a winch frame, a conveyor extending through the winch frame, and a winch drum coupled to the winch frame that drives the conveyor, the winch drum including an outwardly extending flange. The flange includes a plurality of holes spaced along the flange. The conveyor system also includes a torque arm coupled to both the winch frame and the winch drum. The conveyor system also includes a motor and gearbox that drives rotation of the winch drum, and a park brake that provides emergency braking force to the motor and gear box. The conveyor system also includes a locking mechanism positioned proximate the winch drum and including a locking member engageable with the flange, the locking member movable between a first position, in which the locking member is received in one of the plurality of holes to prevent rotation of the winch drum, and a second position, in which the locking member is spaced apart from the flange to permit rotation of the winch drum.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited.

DETAILED DESCRIPTION

Figure 1:
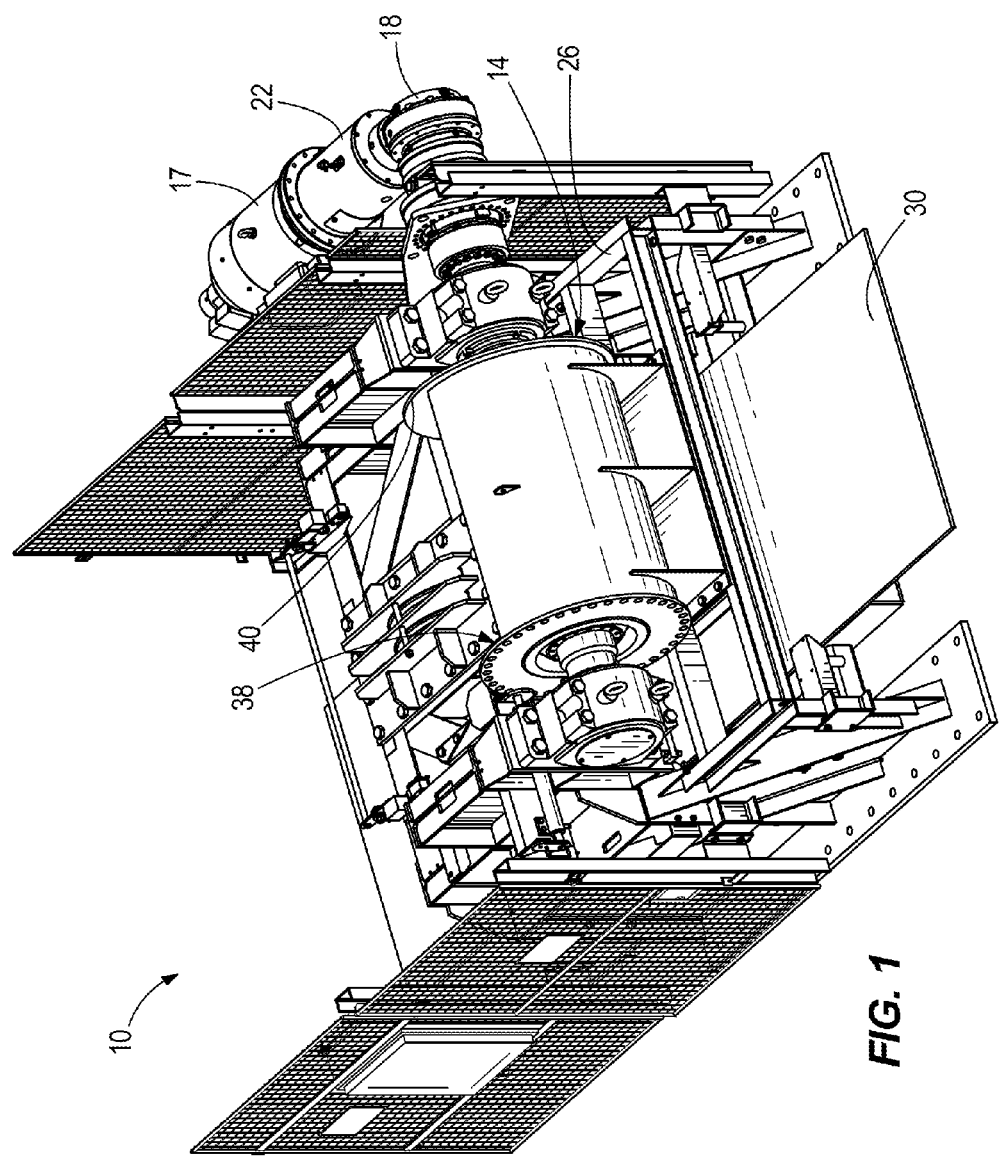
FIG. 1 is a top perspective view of a conveyor system.
Figure 2:
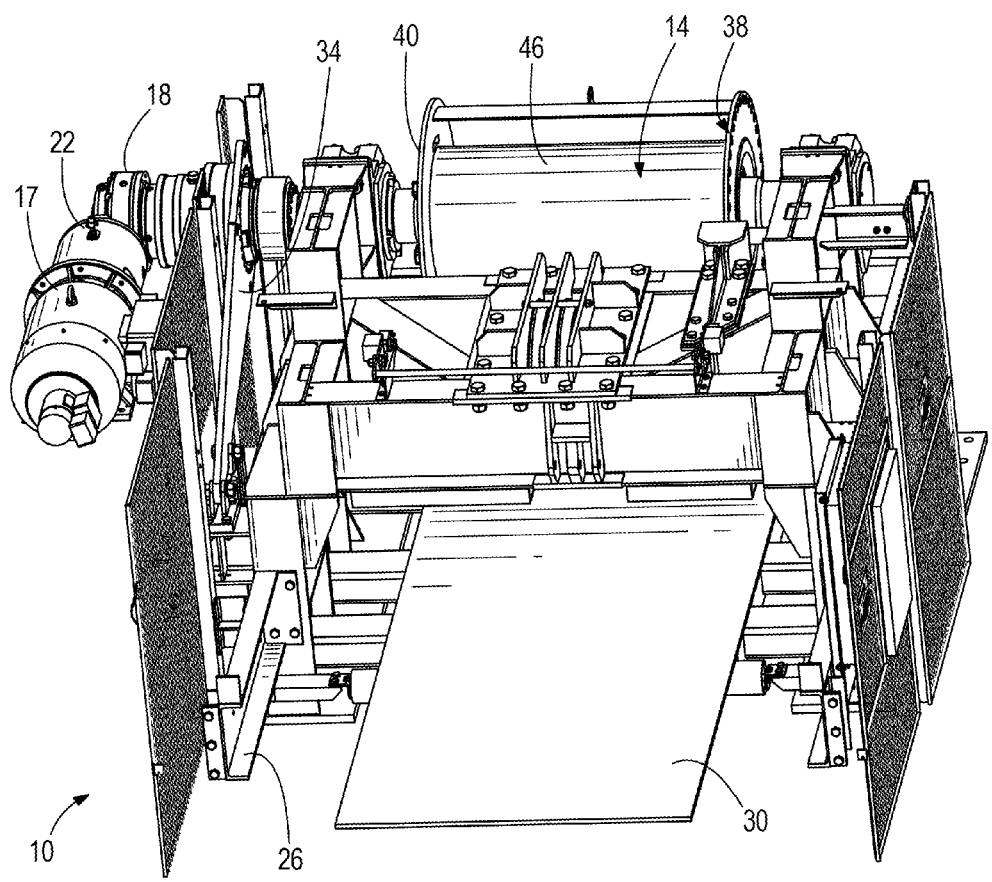
FIG. 2 is a top perspective view of the conveyor system of FIG. 1, illustrating a gearbox torque arm.

FIGS. 1 and 2 illustrate a conveyor system 10 that is used in an underground mining environment to move material out of, or within, the underground mine. The conveyor system 10 includes a winch drum 14, a motor 17 and gearbox 18 that drive rotation of the winch drum 14, and a park brake 22 that provides emergency braking force to the motor 17 and gearbox 18. The conveyor system 10 also includes a winch frame 26, and a conveyor 30 that extends through the winch frame 26. The winch drum 14 is coupled to the winch frame 26. A winch rope (not shown) is wound about the winch drum 14, and is used to move the conveyor 30. The winch drum 14 is a large-scale structure capable of constant application at approximately 80 kN (18000 lbf) and crash loading of approximately 297 kN (67500 lbf). Crash loading refers to stopping tensions caused by a fully loaded conveyor 30 not properly starting (e.g., an "aborted start" or a tripped condition during fully loaded running or an emergency stop condition during fully loaded running).

The conveyor system 10 also includes a torque arm 34. The torque arm 34 is coupled to both the winch drum 14 and to the winch frame 26, and absorbs torsional stress developed by rotation of the winch drum 14 relative to the frame 26.

With reference to FIGS. 1-6, the winch drum 14 includes a pair of outwardly extending flanges 38, 40 located at opposite ends of the drum 14. In the illustrated construction, the flange 38 located opposite the arm 34 includes holes 42. The flange 38 extends circumferentially about a rotational axis 44 of the drum 14, and the holes 42 are positioned circumferentially about the flange 38. The holes 42 are spaced evenly apart from each other along the flange 38. As illustrated in FIG. 2, the flange 38 is a separate member coupled to a central portion 46 of the winch drum 14. In other constructions, the flange 38 is integrally formed with the central portion 46 or the flange 38 is retrofitted to an existing winch drum 14.

The flange 38 has a diameter greater than a diameter of the central portion 46 of the winch drum 14, and the holes 42 are located generally near an outer edge 50 of the flange 38, such that the holes 42 are located radially exterior to the central portion 46.

Figure 3:
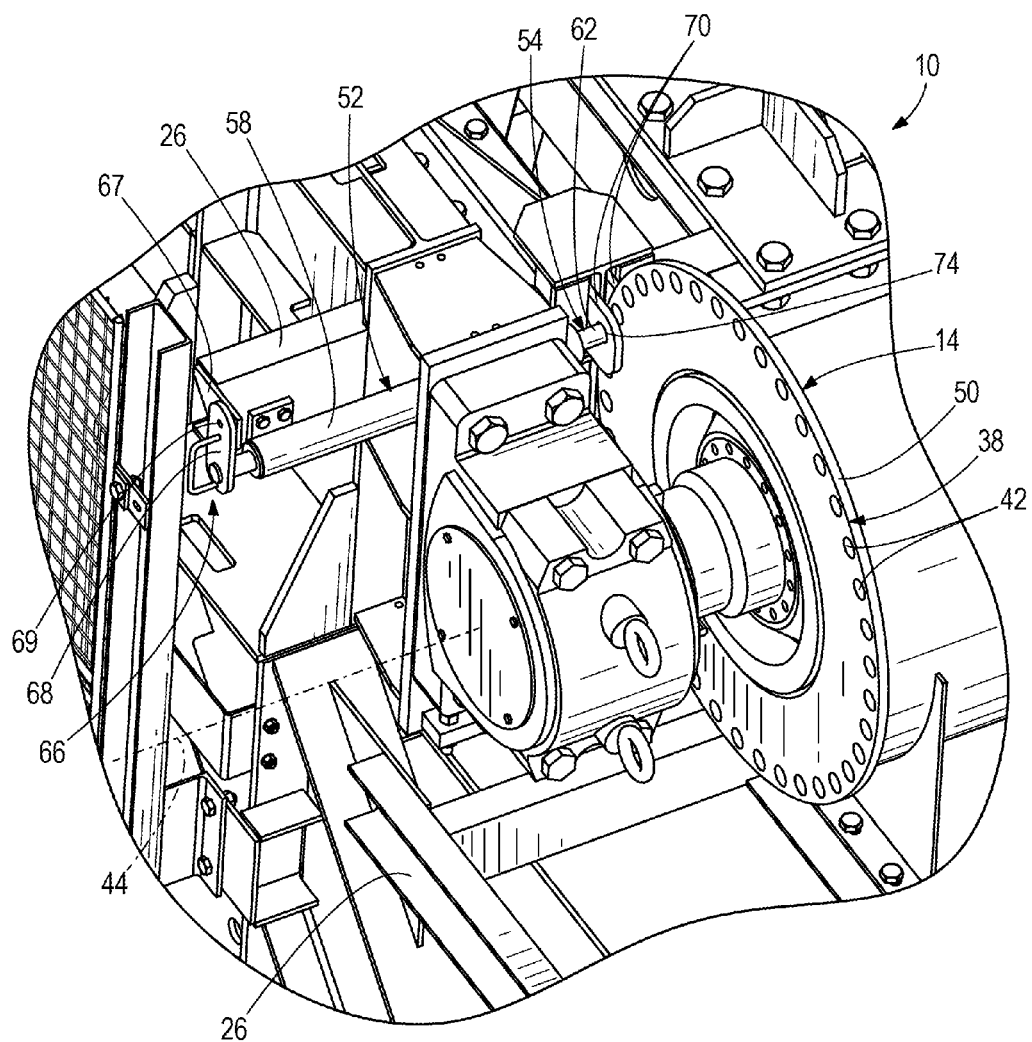
FIGS. 3 and 4 are top perspective views of a winch drum tension isolation system for the conveyor system of FIG. 1.
Figure 4:
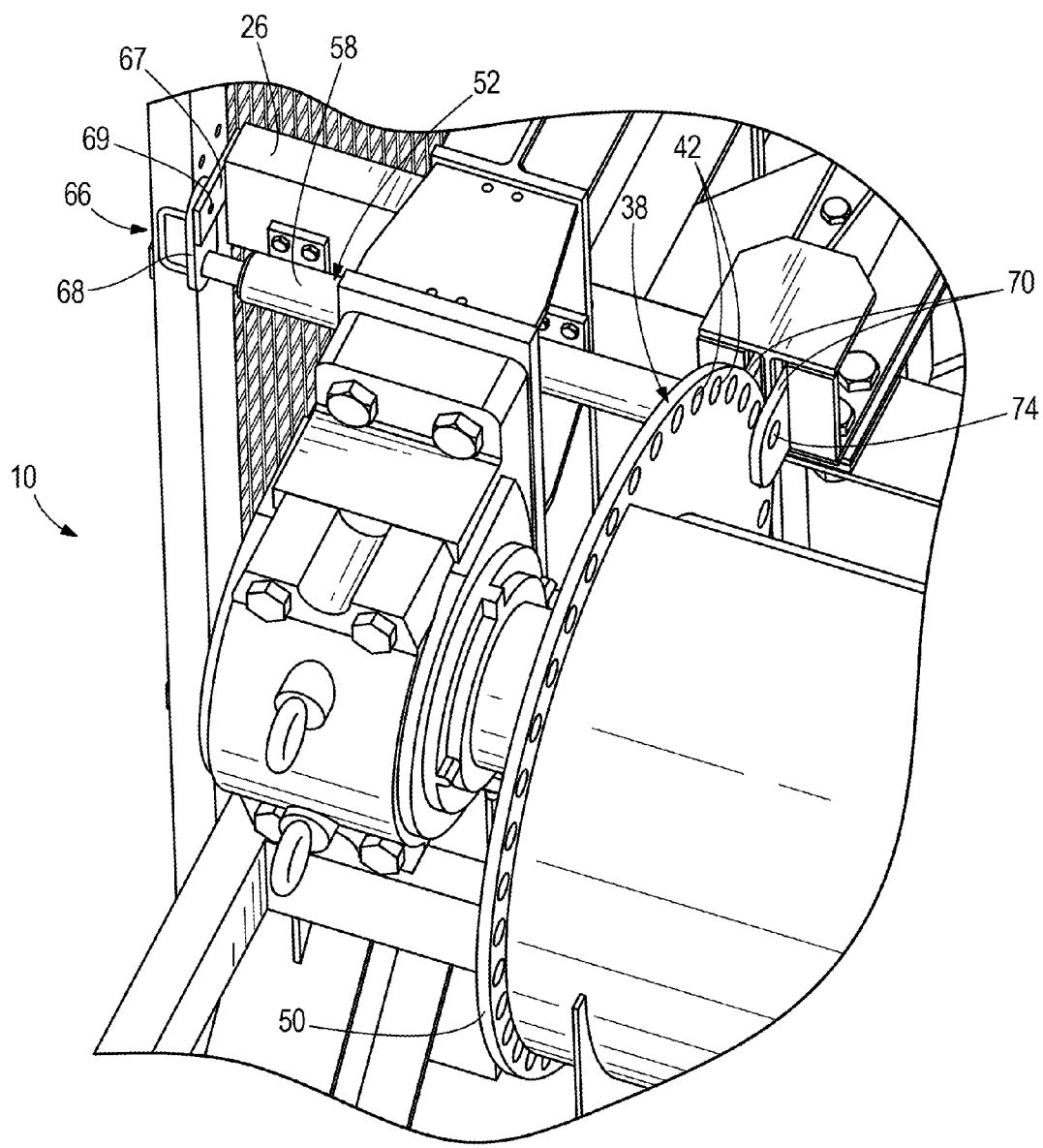
Figure 5:
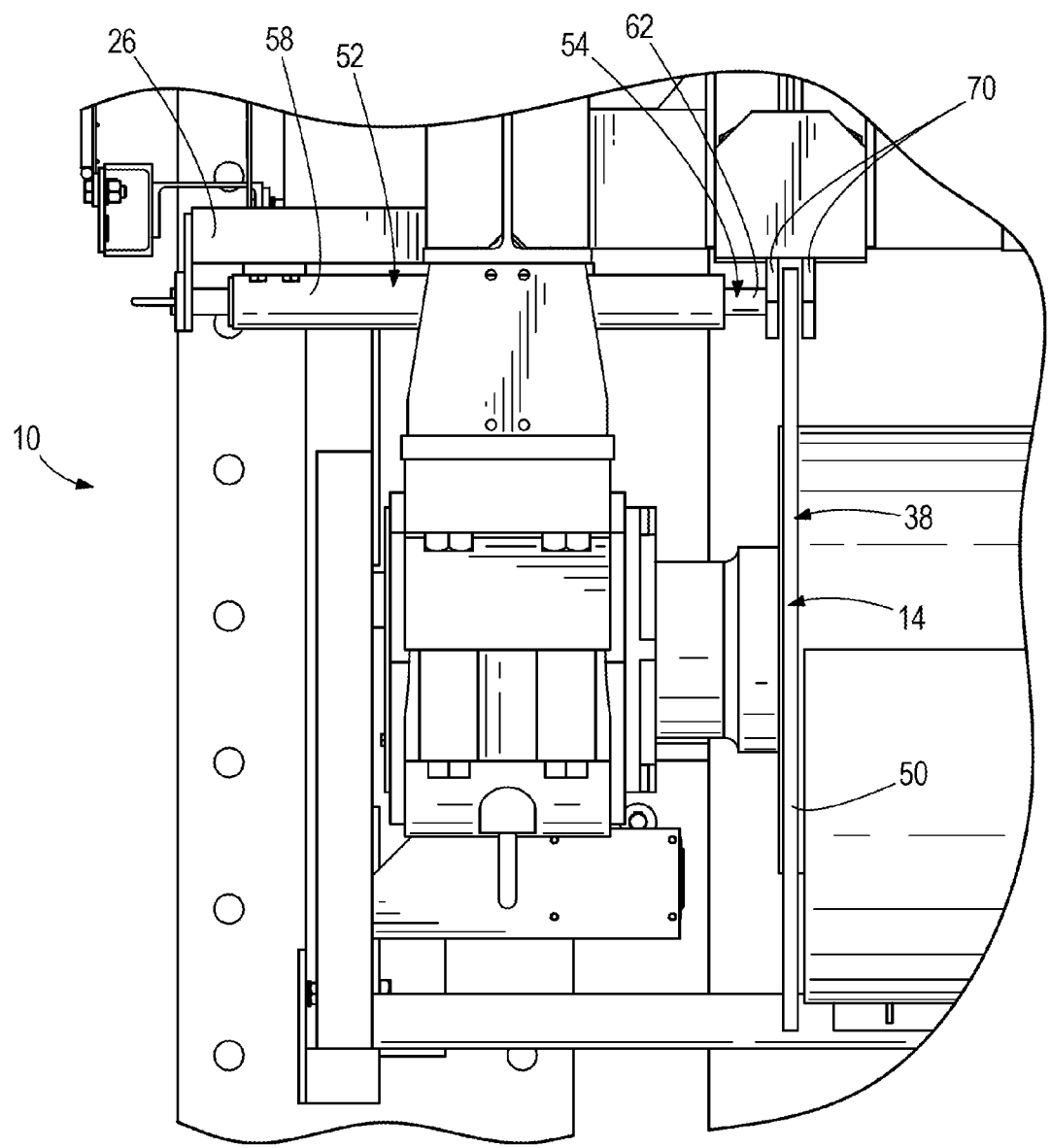
FIG. 5 is a top plan view of the winch drum tension isolation system of FIGS. 3 and 4.
Figure 6:
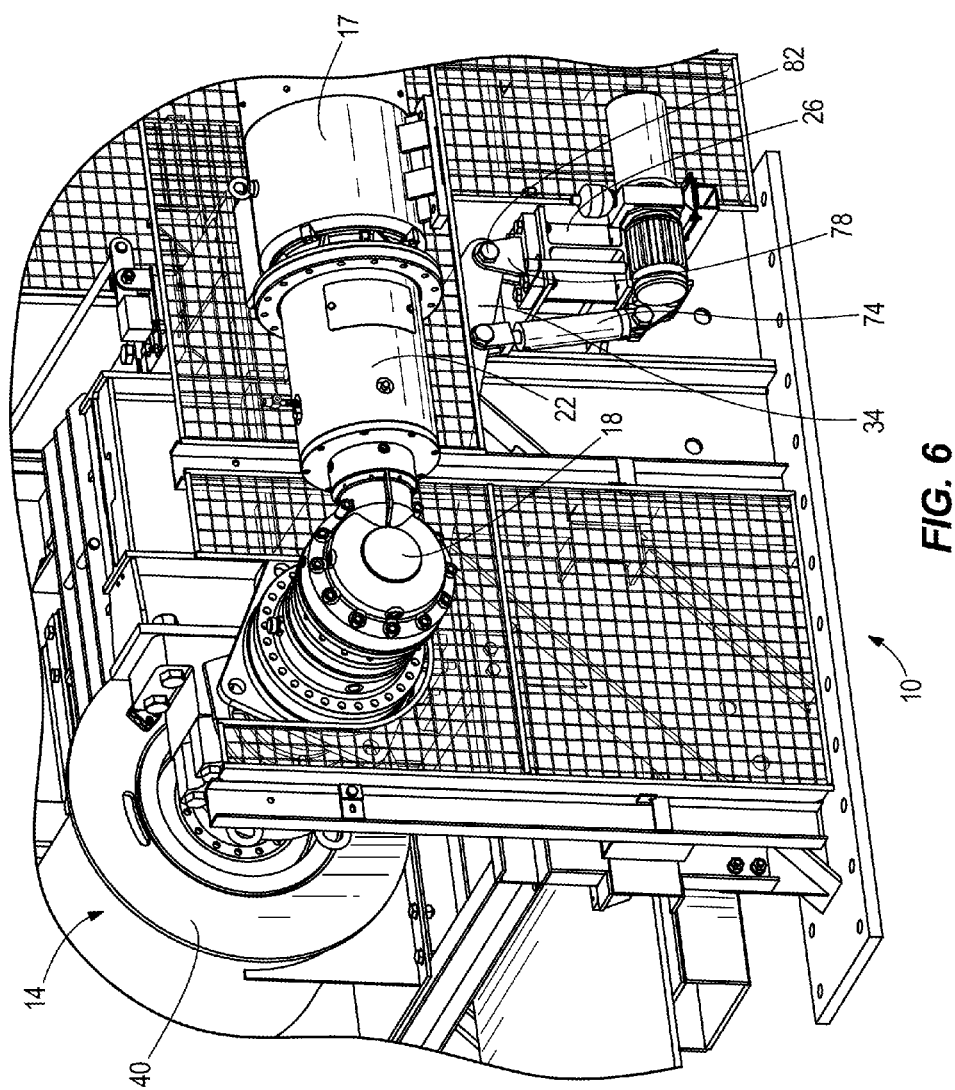
FIG. 6 is a top perspective view of the conveyor system of FIG. 1, illustrating a ram for actuating the gearbox torque arm.

With reference to FIGS. 3-5, the conveyor system 10 includes a locking mechanism 52 positioned proximate the winch drum 14. The locking mechanism 52, in conjunction with the flange 38, forms part of an overall winch drum tension isolation system that isolates tension build-up in the conveyor 30 in the event of a park brake 22 seizure.

The locking mechanism 52 of the winch drum tension isolation system includes a locking member 54 located within a housing 58. In the illustrated construction, the locking member 54 is a spring-loaded pin disposed in the housing 58, though in other constructions the locking member 54 is another structure, including a hydraulically activated pin, etc. The housing 58 is coupled to the winch frame 26, and the locking member 54 slides within the housing 58. The locking member 54 includes a distal end 62 positioned proximate the flange 38 of the drum 14, and the distal end 62 is received in one of the holes 42 of the flange 38 depending upon a position of the locking member 54. When the locking member 54 is in a first position, the distal end 62 of the locking member 54 is received in one of the holes 42 and the locking member 54 inhibits movement of the drum 14. When the locking member 54 is in a second position, the distal end 62 is spaced apart from and does not engage the flange 38 such that movement of the drum 14 is permitted.

The locking mechanism 52 includes a restraining mechanism 66 that restrains movement of the locking member 54 relative to the winch drum 14. In the illustrated construction, the restraining mechanism 66 includes a flange 67 on the winch frame 26 and a flange 68 on an end of the locking member 54. As illustrated in FIGS. 3 and 4, the flanges 67 and 68 include holes 69. When the restraining mechanism 66 is in a locked position, the holes 69 are aligned, and a bolt (not shown) is passed through the flanges, thereby locking movement of the locking member 54. To release the restraining mechanism 66, the bolt is removed, and the flange 68 is rotated relative to the flange 67 (e.g., 90 degrees) so that the flange 68 is able to move toward the flange 38. Once released, the locking member 54 (i.e., the spring-loaded pin in the illustrated construction) moves toward the flange 38, and the distal end 62 of the locking member 54 moves toward one of the holes 42. In the illustrated construction, a spring element (not shown) is located inside the housing 58 and biases the locking member 54 toward the flange 38. When the restraining mechanism 66 is in a locked position, the spring element maintains potential energy in the spring that is released and causes movement of the locking member 54 toward the flange 38 once the restraining mechanism 66 is unlocked and the flange 68 is rotated. In other constructions, different restraining mechanisms are used, including restraining mechanisms that lock the locking member 54 at more than one position, restraining mechanisms that utilize padlocks to lock the locking member 54, etc.

The locking mechanism 52 is positioned on the winch frame 26 such that the locking member 54, and in particular the distal end 62, is generally aligned radially with the holes 42. Based on rotational positioning of the winch drum 14, the distal end 62 extends through one of the holes 42 when the restraining member 66 is released.

With reference to FIGS. 3-5, the locking mechanism 52 includes guide members 70 located on either side of the flange 38. Each of the guide members 70 includes an opening 74 for receiving the locking member 54 and guiding the locking member 54 into alignment with one of the holes 42.

In the illustrated construction, the flange 38 and the locking member 54 prevent rotation of the winch drum 14 in the case of a brake seizure in the park brake 22, and isolate tension that builds up in the conveyor 30. As noted above, occasionally the conveyor 30 experiences an emergency stop and the park brake 22 sees dynamic braking loads causing the park brake 22 to overheat and seize. The seized park brake 22 ends up trapping stored energy in an elastic belt of the conveyor 30, and the load cannot be released from the seized park brake 22. This situation places operators at risk to replace or repair the motor 17, gearbox 18 or park brake 22, since the winch drum 14 could, if not restrained, suddenly and without warning begin rotating again, thereby releasing the stored energy and causing injury or damage to a nearby operator or the conveyor system 10.

In order to remove the stored energy safely, the flange 38 and the locking member 54 are utilized to lock rotation of the winch drum 14 and isolate the tension in the conveyor 30 while replacement and/or repairs are made. In particular, if the distal end 62 of the locking member 54 is aligned with one of the holes 42 after seizure, the restraining mechanism 66 is released (as described above), and the distal end 62 of the locking member 54 moves towards the hole 42. In the illustrated construction, the locking member 54 is a biasing member biased toward the holes 42 by a spring element (not shown). Thus, when the restraining member 66 is released, the locking member automatically moves toward the aligned hole 42.

With the locking member 54 received by the aligned hole 42 and the guide members 70, rotation of the winch drum 14 is prevented. With rotation of the winch drum 14 prevented, the motor 17, gear box 18, park brake 22, and/or other structure are removed and/or repaired, and the stored energy is removed safely without the risk of the winch drum 42 causing injury or damage.

If the distal end 62 of the locking member 54 is not aligned with one of the holes 42 after seizure, then the torque arm 34 is used to rotate the winch drum 14 until one of the holes 42 aligns with the distal end 62 of the locking member 54. For example, and with reference to FIG. 6, the torque arm 34 is raised or lowered via a ram 74, though in other constructions other mechanisms are used. The ram 74 is connected to an external hydraulic system, hand pump, or other source of pressure (not shown). Additionally, the torque arm 34 is coupled to an anchor point 78, which is coupled to the winch frame 26 by an anchor pin 82. In order to initially release the anchor pin 82 (which is under a load), the ram 74 is activated to move the torque arm 34 slightly, relieving the stress on the anchor pin 82, such that the anchor pin 82 is removed, and the torque arm 34 is then rotated until one of the holes 42 is aligned with the distal end 62 of the locking member 54.

The motor 17 and gearbox 18 are advantageously not needed to rotate the winch drum 14 such that one of the holes 42 in the flange 38 aligns with the locking member 54. Rather, the torque arm 34 is raised or lowered solely with the ram 74 so as to rotate the winch drum 14 in either direction about the rotational axis 44, until one of the holes 42 is aligned with the locking member 54. With the hole 42 aligned, the restraining mechanism 66 is then unlocked, for example by removing a bolt from holes 69 and rotating the flange 67 relative to the flange 68, and the distal end 62 of the locking member 54 is biased (in the illustrated construction automatically via the biasing force of the spring element) toward the flange 38 until the distal end 62 is seated in the aligned hole 42 and the guide members 70, thereby locking rotation of the winch drum 14.

Once the motor 17, gear box 18, park brake 22, and/or other structure is repaired and/or replaced, the locking member 54 is removed from the hole 42 (e.g., by a user or machine pulling the locking member 54 from the hole 42 while gripping the flange 68). The torque arm 34 is moved again with the ram 74, and the anchor pin 82 is inserted back in the anchor point 78. With the locking member 54 removed, the restraining mechanism 66 is applied to the locking member 54 to prevent the locking member 54 from re-engaging the flange 38. In the illustrated construction, the flange 68 is rotated relative to the flange 67 until the holes 69 align, and the bolt is placed back in the holes 69.

Although the invention has been described in detail with reference to certain preferred embodiments, variations and modifications exist within the scope and spirit of one or more independent aspects of the invention as described.

The invention claimed is:

1. A winch drum tension isolation system comprising:
   a winch drum including an outwardly extending flange, the flange including a plurality of holes spaced along the flange;
   a locking mechanism positioned proximate the winch drum and including a locking member engageable with the flange, the locking member movable between a first position, in which the locking member is received in one of the plurality of holes to prevent rotation of the winch drum, and a second position, in which the locking member is spaced apart from the flange to permit rotation of the winch drum; and
   a motor and gearbox coupled to the winch drum.

2. The winch drum tension isolation system of claim 1, wherein the winch drum includes a central portion having a first diameter, and the flange has a second diameter greater than the first diameter.

3. The winch drum tension isolation system of claim 1, wherein the flange includes an outer radial circumference.

4. The winch drum tension isolation system of claim 1, wherein the plurality of holes are spaced circumferentially about the flange.

5. The winch drum tension isolation system of claim 1, wherein the plurality of holes are spaced evenly apart along the flange.

6. The winch drum tension isolation system of claim 1, wherein the locking member is a spring-loaded pin.

7. The conveyor system of claim 6, wherein the spring-loaded pin includes a spring that biases a pin into one of the plurality of holes.

8. The winch drum tension isolation system of claim 1, wherein the locking mechanism includes a housing and the locking member is slidable through the housing.

9. The conveyor system of claim 8, wherein the housing is rigidly mounted to a stationary frame.

10. The winch drum tension isolation system of claim 1, further comprising a torque arm coupled to the winch drum, and a winch frame, the winch drum and the locking mechanism both coupled to the winch frame.

11. The winch drum tension isolation system of claim 10, further comprising a ram that drives the torque arm.

12. The winch drum tension isolation system of claim 10, further comprising an anchor point coupled to the winch frame.

13. The winch drum tension isolation system of claim 12, further comprising an anchor pin extending through the anchor point and the torque arm to restrain movement of the torque arm.

14. The winch drum tension isolation system of claim 1, wherein the locking mechanism includes a restraining mechanism to restrain movement of the locking member, the restraining mechanism including a flange at an end of the locking member.

15. A conveyor system comprises:
   a winch frame;
   a conveyor extending through the winch frame;
   a winch drum coupled to the winch frame that drives the conveyor, the winch drum including an outwardly extending flange having a plurality of holes spaced along the flange;
   a torque arm coupled to both the winch frame and the winch drum;
   a motor and gearbox that drives rotation of the winch drum;
   a park brake that provides emergency braking force to the motor and gear box; and
   a locking mechanism positioned proximate the winch drum and including a locking member engageable with the flange, the locking member movable between a first position, in which the locking member is received in one of the plurality of holes to prevent rotation of the winch drum, and a second position, in which the locking member is spaced apart from the flange to permit rotation of the winch drum.

16. The conveyor system of claim 15, wherein the winch drum includes a central portion having a first diameter, and the flange has a second diameter greater than the first diameter.

17. The conveyor system of claim 15, wherein the flange includes an outer radial circumference.

18. The conveyor system of claim 15, wherein the plurality of holes are spaced circumferentially about the flange.

19. The conveyor system of claim 15, wherein the plurality of holes are spaced evenly apart along the flange.

20. The conveyor system of claim 15, wherein the locking member is a spring-loaded pin.

21. The conveyor system of claim 15, wherein the locking mechanism includes a housing and the locking member is slidable through the housing.

22. A winch drum tension isolation system comprising:
   a winch drum including an outwardly extending flange, the flange including a plurality of holes spaced along the flange;
   a locking mechanism positioned proximate the winch drum and including a locking member engageable with the flange, the locking member movable between a first position, in which the locking member is received in one of the plurality of holes to prevent rotation of the winch drum, and a second position, in which the locking member is spaced apart from the flange to permit rotation of the winch drum;
   a torque arm coupled to the winch drum; and
   a winch frame, wherein the winch drum and the locking mechanism are both coupled to the winch frame.

23. A winch drum tension isolation system comprising:
   a winch drum including an outwardly extending flange, the flange including a plurality of holes spaced along the flange;
   a locking mechanism positioned proximate the winch drum and including a locking member engageable with the flange, the locking member movable between a first position, in which the locking member is received in one of the plurality of holes to prevent rotation of the winch drum, and a second position, in which the locking member is spaced apart from the flange to permit rotation of the winch drum, wherein the locking mechanism further includes a restraining mechanism to restrain movement of the locking member, the restraining mechanism including a flange at an end of the locking member.

* * * * *